United States Patent
Hwang et al.

(10) Patent No.: US 7,961,789 B2
(45) Date of Patent: Jun. 14, 2011

(54) METHOD AND APPARATUS FOR DETERMINING SEARCH RANGE FOR ADAPTIVE MOTION VECTOR FOR USE IN VIDEO ENCODER

(75) Inventors: Inseong Hwang, Seoul (KR); Chulwoo Kim, Seoul (KR); Min-Cheol Hong, Seoul (KR); Kyoung-Seok In, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 976 days.

(21) Appl. No.: 10/552,938

(22) PCT Filed: Apr. 8, 2004

(86) PCT No.: PCT/KR2004/000821
§ 371 (c)(1),
(2), (4) Date: Mar. 26, 2008

(87) PCT Pub. No.: WO2004/091222
PCT Pub. Date: Oct. 21, 2004

(65) Prior Publication Data
US 2008/0170616 A1 Jul. 17, 2008

(30) Foreign Application Priority Data
Apr. 10, 2003 (KR) .................. 10-2003-0022784

(51) Int. Cl.
*H04N 11/02* (2006.01)

(52) U.S. Cl. .................. 375/240.16; 348/699

(58) Field of Classification Search .................. None
See application file for complete search history.

(56) References Cited

U.S. PATENT DOCUMENTS
2003/0142749 A1* 7/2003 Hong .................. 375/240.16

FOREIGN PATENT DOCUMENTS
KR 2003/027425 4/2003
* cited by examiner

*Primary Examiner* — Christopher Kelley
*Assistant Examiner* — Christopher Findley
(74) *Attorney, Agent, or Firm* — Lowe Hauptman Ham & Berner LLP

(57) ABSTRACT

The video encoder in accordance with the present invention divides input image signal into macro blocks, estimates motion vectors of each macro block and finally encodes the input image signal. The encoder determines the number of macro blocks adjacent to a current macro block. If the number of adjacent macro blocks is equal to or more than two, the encoder calculates a motion vector of the adjacent macro blocks and selects a macro block that has the largest motion vector. Then it defines a least search area that the current adaptive motion vector can have, and compares the least search area with the motion vector of the largest adjacent macro block, and finally determines the largest value as the search area of the adaptive motion vector. Next, the encoder compares the search area of the adaptive motion vector with the search area of the user-defined motion adaptive vector to thereby determine the least value as the search area of the final adaptive motion vector.

18 Claims, 3 Drawing Sheets

| $MVDx_{mbp}$ | $MODEx$ | $MVDy_{mbp}$ | $MODEy_{mbp}$ |
|---|---|---|---|
| | (0~2bit) | | (0~2bit) |

US 7,961,789 B2

METHOD AND APPARATUS FOR DETERMINING SEARCH RANGE FOR ADAPTIVE MOTION VECTOR FOR USE IN VIDEO ENCODER

TECHNICAL FIELD

The present invention relates to a method and apparatus for determining a search range for an adaptive motion vector in a video encoder, and more particularly to a method and apparatus for determining a search range for an adaptive motion vector by estimating a range for a motion vector based on motion vectors of neighboring macro blocks in a video encoder, which receives input image signals representing a continuity of images, and divides images of the input image signals into a plurality of macro blocks (MBs) in order to search a movement of a motion vector of a macro block for encoding images.

BACKGROUND ART

Recently, various techniques and standards for encoding and compressing motion pictures or still images have been suggested. Such standards are provided to efficiently compress and encode images with high performance. Currently, MPEG-1, MPEG-2, MPEG-4, H.261, H.263 and JVT methods have been already issued or have been suggested as standards regarding the image encoding for motion pictures or still images.

Herein, the JVT method employs motion estimation, similarly to the various international standards mentioned above. In addition, in order to encode residual signals appearing as a result of the motion estimation, image signals are temporarily and spatially transformed, scanned by using a zig-zag scanning, and then, encoded by using a quantization process. The above-mentioned image encoding method encodes images on the basis of blocks. As described above, when compressing and encoding motion pictures and still images through the motion estimation based on blocks, a macro block obtained by combining blocks in an image frame with each other has a motion vector. Since correlation exists between motion vectors of neighboring macro blocks from among a plurality of macro blocks, motion vectors of the previous frame of the neighboring macro blocks are used for encoding a motion vector of each macro block. In the JVT method, after calculating a prediction vector for a current macro block to be encoded, difference vectors between motion vectors of neighboring macro blocks adjacent to the current macro block and the prediction vector are encoded. Therefore, the JVT method is widely utilized when encoding images based on blocks due to its high efficiency.

However, although a conventional algorithm for estimating a motion vector is rather simple theoretically, a calculation procedure required for finding the motion vector is very complex. Accordingly, most of time may be spent for finding a motion vector during the encoding procedure. A full block matching algorithm (FBMA), a popular motion estimation algorithm, is a method for finding a macro block having the least distortion after calculating distortion measure for all macro blocks in a search range. The FBMA is the most optimal method for finding motion vectors, because the FBMA searches for all macro blocks including vectors having possibility to be determined as motion vectors and searches for a macro block for finding a current motion vector. However, since an excessive distortion computation gives considerable burden to a video encoder, the FBMA method has a limitation in practice. For example, if there is a wide search range, such as a high definition television, it is impossible to process data in real-time because the number of pixels to be compared with each other is enormous. In order to perform real-time data process, the size and the capacity of hardware significantly increase.

FIG. 1 is a view showing a current motion vector to be encoded and neighboring motion vector adjacent to the current motion vector, in a motion vector estimating method used for H.261, MPEG-1, MPEG-2, etc., which are various conventional standards for encoding motion pictures.

The motion vector estimating method used for H.261, MPEG-1, MPEG-2, etc., employs only a motion vector MV1 of a macro block immediately before a current macro block as a predictor when estimating a motion vector MV of the current macro block. Since the motion vector estimating method uses only the motion vector MV1 of the macro block immediately before the current macro block as a predictor, it is difficult to ensure reliability of values obtained when computing the motion vector of the current macro block.

FIG. 2 is a view showing a current motion vector to be encoded and neighboring motion vectors adjacent to the current motion vector, in a motion vector estimating method used for H.263, MPEG-4, etc., which are various conventional standards for encoding a motion picture.

As shown in FIG. 2, in the motion vector estimating method used for H.263, MPEG-4, etc., three motion vectors MV1, MV2, and MV3 of three macro blocks, which are closely positioned in a left side, an upper side, and a right side of the current motion vector MV to be encoded, are selected as candidates to be used for a prediction. The motion vector estimating method, which is used for H.263 or MPEG-4, etc., includes median prediction and minimum bit rate prediction.

FIG. 3 is a view a method for finding a search range for a motion vector of a current macro block by using the median prediction, in H.263 and MPEG-4, which are various conventional standards for encoding a motion picture.

A predictor 301 outputs each median value according to x and y components by selecting median values from among values of x and y directions with respect to the three motion vectors MV1, MV2, and MV3 positioned around the current motion vector MV to be encoded as shown in FIG. 2. Each median value outputted according to each component of x and y can be represented as equation 1.

$$PMVx=Median(MV1x, MV2x, MV3x),$$
$$PMVy=Median(MV1y, MV2y, MV3y) \quad \text{Equation 1}$$

Also, an operation unit 302 finds a difference value MVD between the current motion vector to be encoded and the PMVx and PMVy values so as to send the MVD to a decoder according to x and y components. The difference values MVDx and MVDy represented, corresponding to x and y components, can be represented as equation 2.

$$MVDx=MVx-PMVx, MVDy=MVy-PMVy \quad \text{Equation 2}$$

Herein, the MVx is a value corresponding to the x component of the current motion vector to be encoded, and the MVy is a value corresponding to the y component of the current motion vector to be encoded.

The median prediction has relatively higher reliability than the method shown in FIG. 1 because the median prediction employs motion vectors of the three neighboring macro blocks. The median prediction has a characteristic in that the median prediction equally utilizes the motion vectors of the three neighboring macro blocks. However, the motion vectors of the neighboring macro blocks have mutually different correlation with respect to the motion vector of the current block. Accordingly, since the difference of correlation is not considered, reliability for the median prediction is absolutely low.

Therefore, in order to solve the above-mentioned problems, a method for finding a search range for the motion vector of the current macro block by using the minimum bit rate prediction, has been proposed. The method is used for finding a prediction error between a position of the current motion vector to be encoded and positions of neighbor motion vectors so as to select a neighbor motion vector having the smallest number of prediction error bits. After selecting the neighbor motion vector having the smallest number of the prediction error bits, the prediction error of the current motion vector to be encoded and a selected neighbor motion vector is encoded, and mode information for reporting a motion vector used for prediction is sent.

FIG. 4 is a view showing a bit-stream structure obtained when encoding movement of the current macro block by using one dimensional minimum bit rate prediction in H.263 and MPEG-4, which are various conventional standards for encoding a motion picture.

As shown in FIG. 4, an encoding process for a motion vector based on one dimensional minimum bit rate prediction is realized with a prediction error "$MVDx_{mbp}$" for an x component, x mode information "MODEx", a prediction error "$MVDy_{mbp}$" for an y component, and y mode information "MODEy" in two dimension.

In such an encoding process based on the minimum bit rate prediction, mode information and MVD information, which is prediction error information, with respect to x and y components may exist in data to be transferred. The prediction error information has a small number of bits because the minimum bit rate prediction is employed. In contrast, since the mode information has a great number of bits, burden for the mode information is relatively heavy. Such burden may obstruct a real-time compression and encoding process and increase an amount of data transferred, so that it is impossible to efficiently transfer data.

DISCLOSURE OF THE INVENTION

The present invention is made to solve the above problems, and accordingly, an object of the present invention is to provide a method and a system capable of adaptively estimating a search range for a motion vector based on information of neighboring macro blocks by utilizing a characteristic that a movement of the motion vector of the current macro block is very similar to a movement of motion vectors of already-encoded neighboring macro blocks. To this end, a maximum magnitude of the motion vector of the neighboring macro block is found and a minimum value of the range for the motion vector of the current macro block is defined. Then, the search range for the motion vector of the current macro block is defined through performing comparison and converting processes with respect to a maximum magnitude of the motion vector of the neighboring macro block and a minimum value of a range for the motion vector of the current macro block, thereby reducing an amount of computation in an encoding part.

To accomplish the above object, according to an aspect of the present invention, there is provided a method for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the method comprising the steps of: (a) determining the number of neighboring blocks adjacent to a current macro block; (b) determining a motion vector having the greatest movement by finding magnitudes of motion vectors of the neighboring blocks, if the number of the neighboring blocks is greater than 2; (c) defining a minimum value of the search range for the adaptive motion vector of the current macro block; (d) comparing a double of a magnitude of the motion vector with the greatest movement determined at step (b) with the minimum value of the search range for the adaptive motion vector found at step (c) so as to determine a larger value as a value of the search range for the adaptive motion vector; and (e) comparing the value of the search range for the adaptive motion vector found at step (d) with a value of the search range for the adaptive motion vector defined by a user so as to determine a smaller value as a value of a search range of a final adaptive motion vector.

To accomplish the above object, according to another aspect of the present invention, there is provided an apparatus for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the apparatus comprising: a determination part for determining the number of neighboring blocks adjacent to a current macro block; a calculation part for calculating a minimum value of the search range for the adaptive motion vector of the current macro block or magnitudes of the motion vectors of the macro blocks; a first comparison part for comparing the double of the magnitude of the motion vector having the greatest movement from among the magnitudes of the motion vectors of the neighboring blocks calculated in the calculation part with the minimum value of the search range for the adaptive motion vector calculated in the calculation part; a decision part for deciding a larger value as a value of the search range for the adaptive motion vector, according to a comparison result of the first comparison part; a second comparison part for comparing the value of the search range for the adaptive motion vector calculated in the calculation part with a value of the search range for the adaptive motion vector defined by a user; and a final decision part for deciding a smaller value as a value of the search range for the final adaptive motion vector, according to a comparison result of the second comparison part.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

In the following description of the present invention, a detailed description of known functions and configurations incorporated herein will be omitted when it may make the subject matter of the present invention rather unclear.

In a JVT method for compressing motion pictures, information temporarily and spatially compressed is created by removing temporal and spatial redundancy information in an encoding process, and information required for a decoding process is added to the compressed information so as to be transferred. The decoding process is achieved in reverse order of the encoding process. According to the present invention, there is provided a method of an apparatus capable of reducing an amount of computation of an encoding part by adaptively estimating a search range for a motion vector based on information of neighboring macro blocks. In particular, a maximum search range for a motion vector of a current macro block can be efficiently determined by using a characteristic in which movement of the motion vector of the current macro block is similar to movement of the motion vectors of the neighboring macro blocks, which have been already encoded.

Figures 4, 5:
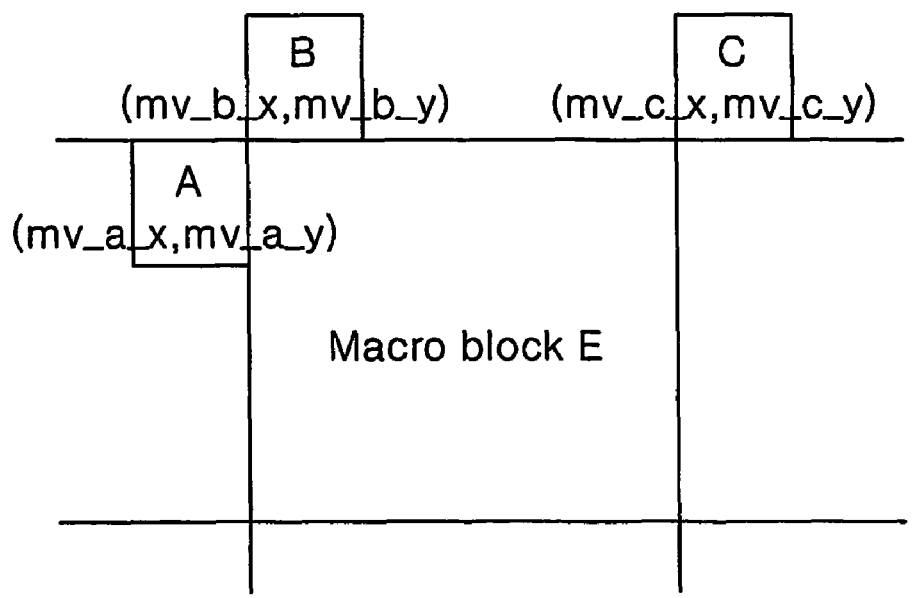
FIG. 4 is a view showing a bit-stream structure obtained when encoding a motion vector of a current macro block by using one dimensional minimum bit rate prediction in H.263 and MPEG-4, which are various conventional standards for encoding a motion picture.
FIG. 5 is a view showing ranges of a current macro block to be encoded and macro blocks around the current macro block according to a preferred embodiment of the present invention.

FIG. 5 is a view showing ranges of a current macro block to be encoded and neighboring macro blocks adjacent to the current macro block according to a preferred embodiment of the present invention.

It is assumed that the current macro block to be encoded is 'E', and the neighboring macro blocks adjacent to the current macro block are 'A', 'B', and 'C'. Also, it is assumed that motion vectors of the blocks 'A', 'B', and 'C' are (mv_a_x, mv_a_y), (mv_b_x, mv_b_y), and (mv_c_x, mv_c_y), respectively. Herein, subscripts 'x' and 'y' refer to motion vectors in horizontal and vertical directions. Under these assumptions, the maximum search range for the motion vector of the current macro block E to be encoded is found based on the motion vectors of the neighboring macro blocks A, B, and C.

Figure 6:
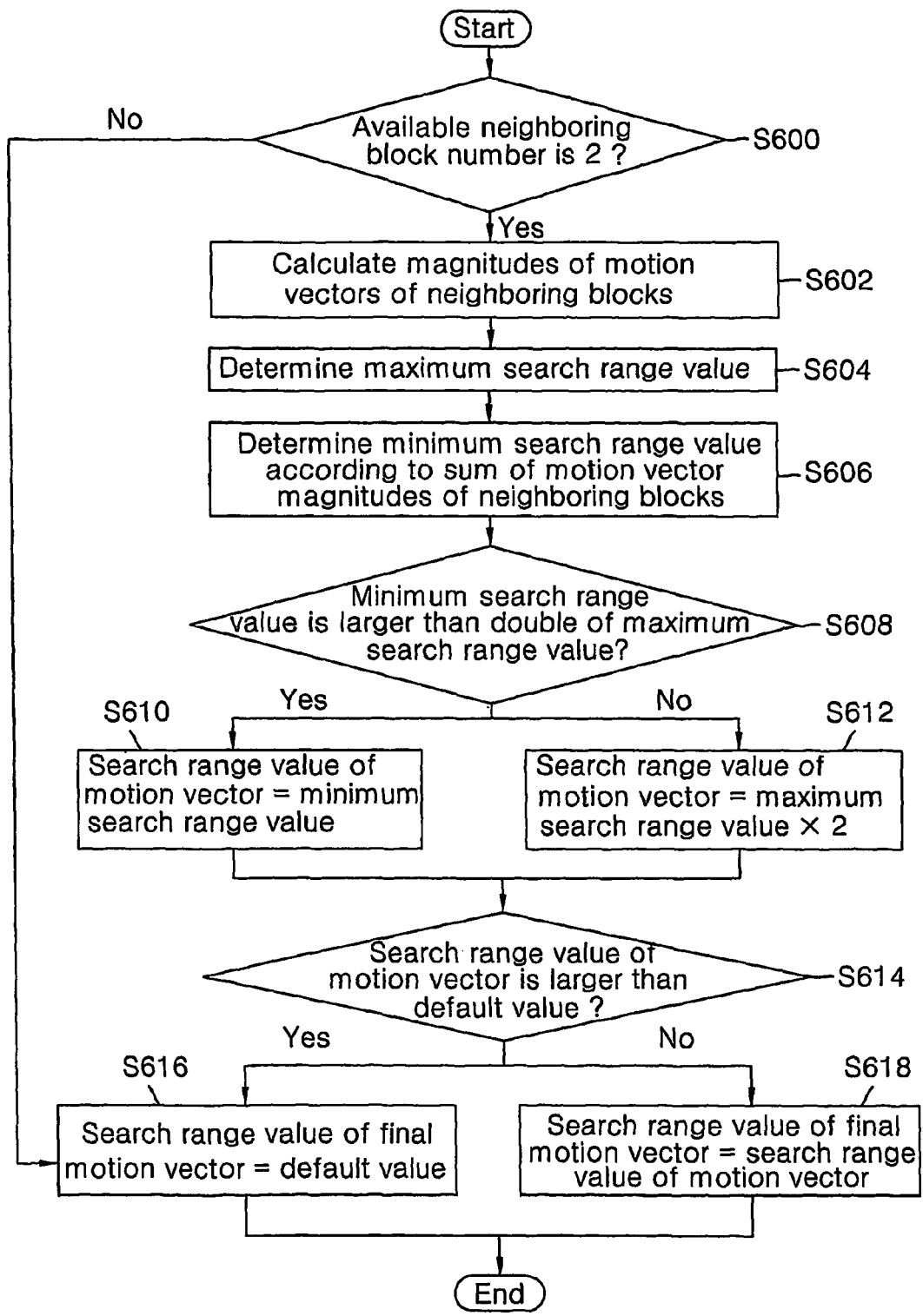
FIG. 6 is a flow chart representing a procedure for finding a search range for a motion vector of a current macro block to be encoded according to a preferred embodiment of the present invention.

FIG. 6 is a flow chart showing a procedure for finding a search range for the motion vector of the current macro block to be encoded according to a preferred embodiment of the present invention.

First, the number of available neighboring blocks shown in FIG. 5 is determined (step 600).

Figure 1:
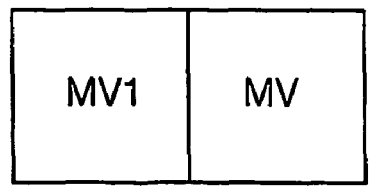
FIG. 1 is a view showing a current motion vector to be encoded and a motion vector adjacent thereto, in a motion vector estimating method applied for H.261, MPEG-1, MPEG-2, etc., which are various conventional standards for encoding motion pictures.
Figure 2:
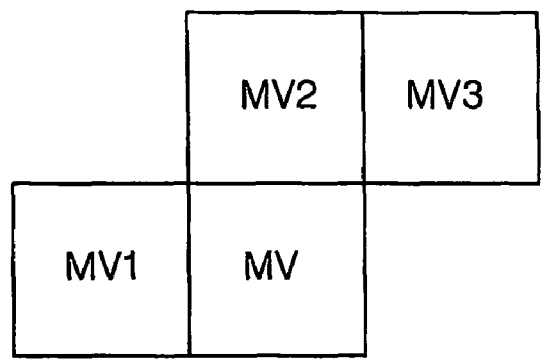
FIG. 2 is a view showing a current motion vector to be encoded and motion vectors around a current motion vector, in a motion vector estimating method used for H.263, MPEG-4, etc., which are various conventional standards for encoding a motion picture.
Figure 3:
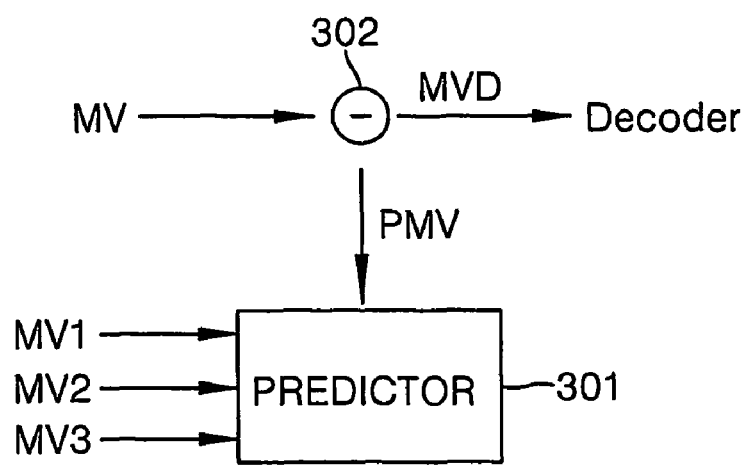
FIG. 3 is a view a method for finding a search range for a motion vector of a current macro block by using a median prediction in H.263 and MPEG-4, which are various conventional standards for encoding a motion picture.

As described above with reference to FIG. 1, if the number of the available neighboring blocks is less than one, when calculating a motion vector of the current macro block, it is difficult to ensure reliability of the calculated motion vector because only a motion vector of a block immediately before the current macro block is used as a prediction vector. Accordingly, if the number of the available neighboring blocks is less than one, a search range for a final adaptive motion vector is set as a default value predetermined by a user when beginning an encoding process (step 616). Step 616 can be represented as equation 3.

$$\text{new\_search\_range\_i} = \text{input\_search\_range} \qquad \text{Equation 3}$$

Herein, the "new_search_range_i" represents the search range for the final adaptive motion vector of the current macro block to be encoded, and the "input_search_range" refers to a default value predetermined by a user in order to prevent error when beginning an encoding process.

Meanwhile, if the number of the available neighboring blocks is greater than two, the magnitudes of motion blocks of the available neighboring blocks are calculated in order to determine a maximum search range for an adaptive motion vector of the current macro block E to be encoded (step 602). The most maximum value of the magnitudes, which is the magnitude of a motion vector of a block with the greatest movement from among motion vectors of the available neighboring blocks, is calculated, thereby determining the most maximum value as a value relating to the maximum search range for the adaptive motion vector of the current macro block E to be encoded in horizontal and vertical directions (step 604). An operation in step 604 can be represented as equation 4.

$$\text{max\_MV\_E\_i} = \max[\text{abs}(MV\_A\_i), \max\{\text{abs}(MV\_B\_i), \text{abs}(MV\_C\_I)\}] \qquad \text{Equation 4}$$

Herein, the "max_MV_E_i" is a vector representing the maximum search range for the adaptive motion vector of the current macro block E to be encoded in horizontal and vertical directions and is represented as (max_MV_E_x, max_MV_E_y). The "max(u,v)" is a function for representing the maximum value of "u" and "v", and the "abs ( )" is a function for representing the absolute value. Also, "MV_A_i", "MV_B_i", and "MV_C_i" represent (mv_a_x, mv_a_y) which is a motion vector of the neighboring block A, (mv_b_x, mv_b_y) which is a motion vector of the neighboring block B, and (mv_c_x, mv_c_y) which is a motion vector of the neighboring block C, respectively. As described above, "i" refers to a horizontal direction or a vertical direction. Also, if a predetermined neighboring block does not exist in an image range, the value of the absolute function is regarded as '0'.

However, according to "max_MV_E_i" estimated through the above-mentioned method, if the movement of the motion vector of the current macro block E to be encoded is greatly different from the movement of the neighboring blocks, a value of the estimated motion vector has a serious error. To prevent the above-mentioned problem, the minimum value of the search range, which represents a statistical characteristic for movement, is found (step 606). The minimum value of the search range can be represented as equation 5.

$$k\_i = \begin{cases} (\text{input\_search\_range} + 2) \div 4 & \text{if}(\alpha i = 0) \\ 3 \times (\text{input\_search\_range} + 8) \div 16 & \text{if}(0 < \alpha i \leq 2) \\ (\text{input\_search\_range} + 4) \div 8 & \text{otherwise} \end{cases} \qquad \text{Equation 5}$$

$$\alpha i = \text{abs}(MV\_A\_1) + \text{abs}(MV\_B\_i) + \text{abs}(MV\_C\_i)$$

If a value of the search range for the motion vector of the current macro block E to be encoded is larger than a value of "input_searh_range", the value of the search range is an erroneous value. Therefore, the value of the search range is set as the value of "input_search_range" in order to prevent such an error. Herein, the value of "input_search_range" is differently defined by a user according to magnitudes of motion vectors of neighboring blocks. Also, "k_i" represents the minimum value of the search range for the motion vector of the current macro block E to be encoded and is a variable for preventing an error, which has been found through an experiment by using a statistical characteristic and the value of "input_search_range" defined by a user.

As represented by equation 5, a value of the "k_i" varies depending on "ai". Also, what the "ai" is large refers to that the sum of magnitudes of motion vectors of neighboring blocks is large. Therefore, as the "ai" is large, a user must set the great value of the "input_search_range". Accordingly, the value of "k_i" is large also. Constants shown in equation 5 are experimental values according to a statistical characteristic for movements of neighboring blocks and are optimized results.

The maximum value of the search range for the adaptive motion vector of the current macro block E to be encoded, which is found in equation 4, is compared with the minimum value of the search range found in equation 5 (step 608), thereby determining the search range for the adaptive motion vector of the current macro block E to be encoded (steps 610 and 612). Operations in steps 608 to 612 can be represented as equation 6.

$$\text{local\_search\_range}\_i = \max(k\_i, 2*\max\_MV\_E\_i) \quad \text{Equation 6}$$

Herein, the "local_search_range_i" represents the search range for the adaptive motion vector of the current macro block E to be encoded. A reason for multiplying a value of the "max_MV_E_i" by two is based on a statistical analysis obtained through an experiment, in which the magnitude of the adaptive motion vector of the current macro block E to be encoded is less than the double of the magnitudes of the motion vectors of the neighboring blocks even if the magnitude of the adaptive motion vector of the current macro block E to be encoded has a greatest value.

Equation 6 is used for preventing error of a motion vector by substituting the minimum value of the search range obtained through equation 5 for a value of the search range for the motion vector of the current macro block E to be encoded If a value of "2*max_MV_E_i" is smaller than the minimum value of the search range obtained through equation 5. This is for preventing an error of the motion vector by determining the value of the search range for the motion vector of the current macro block E to be encoded as the minimum value of the search range by considering a value of "$a_i$" instead of the value of "max_MV_E_i" having a very small value.

However, the search range for the motion vector of the current macro block E to be encoded, determined through equation 6, can be established in such a manner that the search range is greater than a range defined by a user. This occurs when magnitudes of motion vectors of neighboring blocks are greater than a default value established by a user at the beginning of an encoding process. As described above, if the value of the search range for the motion vector of the current macro block E to be encoded, which has been determined through equation 6, is greater than a default value established by a user, the determined value is a meaningless value. If the determined value is used, an error occurs. Accordingly, in order to prevent such an error, restrict conditions are given for defining the maximum search range for a motion vector of the current macro block E to be encoded (steps 614 to 618).

Steps 614 to 618 can be represented with reference to equation 7.

$$\text{new\_search\_range}\_i = \min(\text{input\_search\_range}, \text{local\_search\_range}\_i) \quad \text{Equation 7}$$

The described equations 3 and 7 represent results for models determining the search range for the current final adaptive motion vector to be encoded. That is, if the number of available neighboring blocks is small than one, the search range for the final adaptive motion vector is set as a default value, established by a user at the beginning of an encoding procedure, by considering reliability of a search. If the number of available neighboring blocks is greater than two, the search range for the final adaptive vector is estimated based on motion vectors of neighboring blocks and found based on a default value set by a user in order to prevent an error.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICATION

As can be seen from the foregoing, according to the present invention, it is possible to perform an efficient compression and encoding by reducing an amount of computation required for an FMBA method. Also, it is possible to provide results more reliable than a convention method by estimating a search range for a motion vector of a current block based on movements of motion vectors of neighboring blocks. In addition, according to the present invention, there is no burden derived from excessive data by using only magnitudes of motion vectors of neighboring blocks without additionally using other data such as mode information. In addition, it is possible for an encoder, which employs a JVT motion picture compression method, to perform an encoding process at a high speed. In particular, the present invention can be efficiently used when performing compression and encoding at a high speed or performing compression and encoding with respect to data having low bit rates.

The invention claimed is:

1. A method for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the method comprising the steps of:
   (a) determining the number of neighboring blocks adjacent to a current macro block;
   (b) determining a motion vector having the greatest movement by finding magnitudes of motion vectors of the neighboring blocks, if the number of the neighboring blocks is greater than 2;
   (c) defining a minimum value of a search range for an adaptive motion vector of the current macro block, the minimum value of the search range for the adaptive motion vector varying depending on a sum of the magnitudes of the motion vectors of the neighboring blocks, when the sum of the magnitudes of the motion vectors of the neighboring blocks is equal to '0', setting the minimum value of the search range for the adaptive motion vector to a predetermined value, which is obtained by adding a predetermined constant to the value of the search range for the adaptive motion vector defined by a user, and then, dividing a resultant value of the search range for the adaptive motion vector by four;
   (d) comparing a double of a magnitude of the motion vector with the greatest movement determined at step (b) with the minimum value of the search range for the adaptive motion vector found at step (c) so as to determine a larger value as a value of the search range for the adaptive motion vector; and (e) comparing the value of the search range for the adaptive motion vector found at step (d) with a value of the search range for the adaptive motion vector defined by the user so as to determine a smaller value as a value of a search range of a final adaptive motion vector.

2. The method as claimed in claim 1, wherein, in step (b), the magnitudes of the motion vectors of the neighboring blocks are found by extracting horizontal and vertical components of the motion vectors of the neighboring blocks.

3. The method as claimed in claim 1, wherein the predetermined constant is '2'.

4. The method as claimed in claim 1, wherein the value of the search range for the adaptive motion vector defined by the user is a default value set by the user in order to prevent an error when starting an encoding process.

5. The method as claimed in claim 1, wherein the value of the search range for the adaptive motion vector defined by the user is determined as the value of the search range for a final adaptive motion vector, if the number of the neighboring blocks is less than one.

6. A method for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the method comprising the steps of:

(a) determining the number of neighboring blocks adjacent to a current macro block:

(b) determining a motion vector having the greatest movement by finding magnitudes of motion vectors of the neighboring blocks, if the number of the neighboring blocks is greater than 2;

(c) defining a minimum value of a search range for an adaptive motion vector of the current macro block, the minimum value of the search range for the adaptive motion vector varying depending on a sum of the magnitudes of the motion vectors of the neighboring blocks;

(d) comparing a double of a magnitude of the motion vector with the greatest movement determined at step (b) with the minimum value of the search range for the adaptive motion vector found at step (c) so as to determine a larger value as a value of the search range for the adaptive motion vector; and (e) comparing the value of the search range for the adaptive motion vector found at step (d) with a value of the search range for the adaptive motion vector defined by a user so as to determine a smaller value as a value of a search range of a final adaptive motion vector, wherein the minimum value of the search range for the adaptive motion vector is set to a predetermined value, the predetermined value being obtained by adding a predetermined constant to the value of the search range for the adaptive motion vector defined by the user, multiplying a resultant value of the value of the search range for the adaptive motion vector by three, and then, dividing a resultant value of the search range for the adaptive motion vector by 16, if the sum of the magnitudes of the motion vectors of the neighboring blocks is greater than zero and equal to or less than two.

7. The method as claimed in claim 6, wherein the predetermined constant is '8'.

8. A method for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the method comprising the steps of:

(a) determining the number of neighboring blocks adjacent to a current macro block;

(b) determining a motion vector having the greatest movement by finding magnitudes of motion vectors of the neighboring blocks, if the number of the neighboring blocks is greater than 2;

(c) defining a minimum value of a search range for an adaptive motion vector of the current macro block, the minimum value of the search range for the adaptive motion vector varying depending on a sum of the magnitudes of the motion vectors of the neighboring blocks;

(d) comparing a double of a magnitude of the motion vector with the greatest movement determined at step (b) with the minimum value of the search range for the adaptive motion vector found at step (c) so as to determine a larger value as a value of the search range for the adaptive motion vector; and (e) comparing the value of the search range for the adaptive motion vector found at step (d) with a value of the search range for the adaptive motion vector defined by a user so as to determine a smaller value as a value of a search range of a final adaptive motion vector, wherein the minimum value of the search range for the adaptive motion vector is set to a predetermined value, the predetermined value being obtained by adding a predetermined constant to the value of the search range for the adaptive motion vector defined by the user, and then, dividing a resultant value of the search range for the adaptive motion vector by eight, if the sum of the magnitudes of the motion vectors of the neighboring blocks is greater than two.

9. The method as claimed in claim 8, wherein the predetermined constant is '4'.

10. An apparatus for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the apparatus comprising:

a determination part for determining the number of neighboring blocks adjacent to a current macro block;

a calculation part for calculating a minimum value of a search range for an adaptive motion vector of the current macro block or magnitudes of the motion vectors of the macro blocks;

a first comparison part for comparing twice the magnitude of the motion vector having the greatest movement from among the magnitudes of the motion vectors of the neighboring blocks calculated in the calculation part with the minimum value of the search range for the adaptive motion vector calculated in the calculation part;

a decision part for deciding a larger value as a value of the search range for the adaptive motion vector, according to a comparison result of the first comparison part;

a second comparison part for comparing the value of the search range for the adaptive motion vector calculated in the calculation part with a value of the search range for the adaptive motion vector defined by a user; and a final decision part for deciding a smaller value as a value of the search range for a final adaptive motion vector, according to a comparison result of the second comparison part, wherein the calculation part differently calculates the minimum value of the search range for the adaptive motion vector depending on the sum of the magnitudes of the motion vectors of the neighboring blocks, and the minimum value of the search range for the adaptive motion vector is set to a predetermined value, the predetermined value being obtained by adding a predetermined constant to the value of the search range for the adaptive motion vector defined by the user, and then, dividing a resultant value of the search range for the adaptive motion vector by four, if the sum of the magnitudes of the motion vectors of the neighboring blocks is equal to zero.

11. The apparatus as claimed in claim 10, wherein the magnitudes of the motion vectors are obtained by extracting horizontal and vertical components of the motion vectors.

12. The apparatus as claimed in claim 10, wherein the predetermined constant is '2'.

13. The apparatus as claimed in claim 10, wherein the value of the search range for the adaptive motion vector defined by the user is a default value set by the user in order to prevent an error when starting an encoding process.

14. The apparatus as claimed in claim 10, wherein the final decision part determines the value of the search range for the adaptive motion vector defined by the user as the value of the search range for the final adaptive motion vector, if the number of the neighboring blocks is less than one according to a result of the determination part.

15. An apparatus for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the apparatus comprising:

a determination part for determining the number of neighboring blocks adjacent to a current macro block;

a calculation part for calculating a minimum value of a search range for an adaptive motion vector of the current macro block or magnitudes of the motion vectors of the macro blocks;

a first comparison part for comparing twice the magnitude of the motion vector having the greatest movement from among the magnitudes of the motion vectors of the neighboring blocks calculated in the calculation part with the minimum value of the search range for the adaptive motion vector calculated in the calculation part;

a decision part for deciding a larger value as a value of the search range for the adaptive motion vector, according to a comparison result of the first comparison part;

a second comparison part for comparing the value of the search range for the adaptive motion vector calculated in the calculation part with a value of the search range for the adaptive motion vector defined by a user; and a final decision part for deciding a smaller value as a value of the search range for a final adaptive motion vector, according to a comparison result of the second comparison part, wherein the calculation part differently calculates the minimum value of the search range for the adaptive motion vector depending on the sum of the magnitudes of the motion vectors of the neighboring blocks, and the minimum value of the search range for the adaptive motion vector is set to a value, the value being obtained by adding a predetermined constant to the value of the search range for the adaptive motion vector defined by the user, multiplying a resultant value of the search range for the adaptive motion vector by three, and then, dividing a resultant value of the search range for the adaptive motion vector by 16, if the sum of the magnitudes of the motion vectors of the neighboring blocks is greater than zero and less than or equal to two.

16. The apparatus as claimed in claim 15, wherein the predetermined constant is '8'.

17. An apparatus for determining a search range for an adaptive motion vector in a video encoder, the video encoder receiving input image signals representing a continuity of images, and dividing images of the input image signals into a plurality of macro blocks (MBs) so as to estimate a movement of a motion vector of a macro block for encoding images, the apparatus comprising:

a determination part for determining the number of neighboring blocks adjacent to a current macro block;

a calculation part for calculating a minimum value of a search range for an adaptive motion vector of the current macro block or magnitudes of the motion vectors of the macro blocks;

a first comparison part for comparing twice the magnitude of the motion vector having the greatest movement from among the magnitudes of the motion vectors of the neighboring blocks calculated in the calculation part with the minimum value of the search range for the adaptive motion vector calculated in the calculation part;

a decision part for deciding a larger value as a value of the search range for the adaptive motion vector, according to a comparison result of the first comparison part;

a second comparison part for comparing the value of the search range for the adaptive motion vector calculated in the calculation part with a value of the search range for the adaptive motion vector defined by a user; and a final decision part for deciding a smaller value as a value of the search range for a final adaptive motion vector, according to a comparison result of the second comparison part, wherein the calculation part differently calculates the minimum value of the search range for the adaptive motion vector depending on the sum of the magnitudes of the motion vectors of the neighboring blocks, and the minimum value of the search range for the adaptive motion vector is set to a predetermined value, the predetermined value being obtained by adding a predetermined constant to the value of the search range for the adaptive motion vector defined by the user, and then, dividing a resultant value of the search range for the adaptive motion vector by eight, if the sum of the magnitudes of the motion vectors of the neighboring blocks is greater than two.

18. The apparatus as claimed in claim 17, wherein the predetermined constant is '4'.

* * * * *